UNITED STATES PATENT OFFICE.

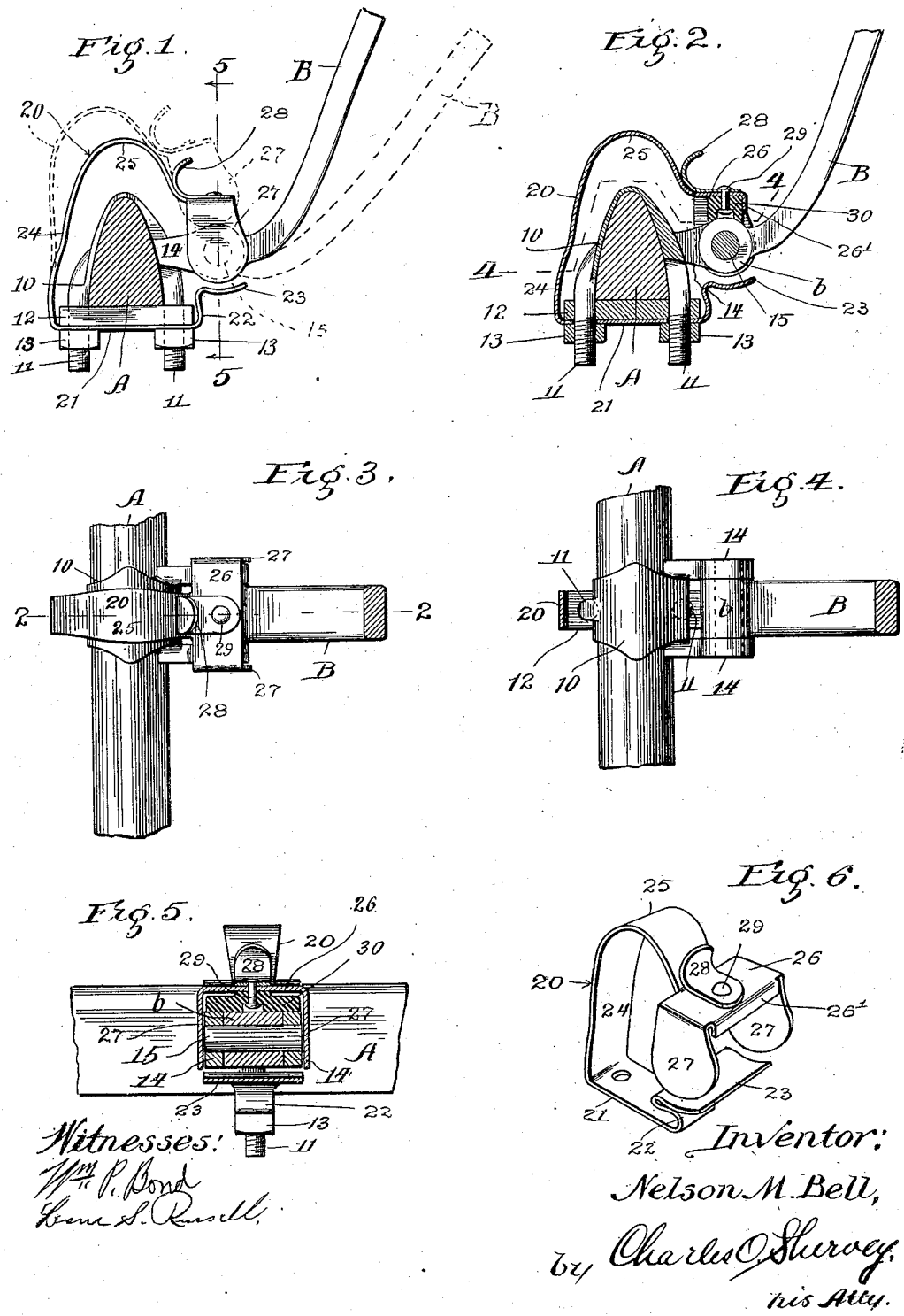

NELSON MARTIN BELL, OF AURORA, ILLINOIS.

THILL-COUPLING.

No. 889,190.  Specification of Letters Patent.  Patented June 2, 1908.

Application filed April 5, 1907. Serial No. 366,478.

*To all whom it may concern:*

Be it known that I, NELSON MARTIN BELL, a citizen of the United States, residing in Aurora, in the county of Kane and State of Illinois, have invented certain new and useful Improvements in Thill-Couplings, of which the following is a full, clear, and exact description.

My invention relates to improvements in thill couplings and is designed to furnish a simple, practical and substantial coupling for connecting thills to the axles of vehicles.

One of the objects of this invention is to provide a thill coupling by means of which the thills may be easily removed from the axle, or attached thereto.

To such end the invention consists in certain novel features of construction, a description of which will be found in the following specification, and the essential features of which will be more particularly set forth in the claims appended hereto.

The invention is clearly illustrated in the drawing accompanying this specification in which Figure 1 is a side view of a thill coupling embodying my invention. Fig. 2 is a vertical longitudinal section taken on line 2—2, Fig. 3. Fig. 3 is a plan view. Fig. 4 is a plan view of a portion of the coupling with a certain clip portion cut away on line 4—4, Fig. 2. Fig. 5 is a vertical cross section taken on line 5—5, Fig. 1 and Fig. 6 is a perspective view of a clip.

In these views, A, represents the axle, and B, one of the thills of an ordinary buggy or wagon. The main body of the coupling is in the form of a yoke 10, which embraces the axle and contains two screw threaded integral bolts 11—11. A cross bar 12, straddles the axle and contains two holes through which extend the screw-threaded bolts 11. Nuts 13 are provided upon said bolts to clamp the coupling upon the axle. Two perforated knuckles 14 project out from the front face of the yoke 10, and the thill B contains a perforated knuckle *b* which lies between the knuckles 14, and is pivotally connected thereto by a pin 15.

A spring clip 20 is secured to the coupling and furnishes means for retaining the pin 15 in place in the knuckles 14, *b*. Said clip is also arranged to prevent rattling of the parts and to temporarily support the thill after the pin has been removed from the knuckles. As shown in the drawings, said clip contains a flat portion 21, that is perforated to receive the bolts 11, of the yoke 10 and said clip is secured in place by means of the nuts 13, that secure the coupling upon the axle. The forward end of the flat portion is bent upward at 22, and outward at 23 to present a supporting ledge, that is arranged to lie just below the knuckles 14, *b*, and said ledge is adapted to support the thill when the pin is withdrawn to disconnect the thill from the axle. The rear end of the flat portion is bent upward as at 24, and curved forward over the axle, to form an arch 25, the forward end of the arch terminating in a horizontal, flat portion 26. The flat portion 26, extends slightly beyond the sides of the knuckles 14, and the ends of said flat portion, are bent down to form protecting ears 27, that are arranged to lie quite close to the knuckles 14, and prevent the accidental dislodgment of the pin 15. A block 30, of some elastic substance, such as rubber, is secured to the under side of the flat portion 26, and bears upon the knuckles 14, *b*, to prevent any rattling of the parts. The arch 25 is given such a bend as will put pressure upon the knuckles 14, *b*, and the interposition of the elastic block effectually prevents any rattle in the parts. A finger piece 28, is secured upon the flat portion 26, by means of a rivet 29, which rivet also passes through the elastic block 30, and connects the same to the flat portion 26. The front edge of the flat portion 26, is bent down to form a flange 26′ which together with the ears 27, entirely inclose the elastic block 30. It may be found desirable in some cases to place said block loosely between the portion 26 and the knuckles instead of riveting or otherwise securing it to said flat portion. In that case it is effectually kept in its place between the clip and knuckle.

When it is desired to remove the thills, the arched end of the clip 20, is raised, as shown by the dotted lines in Fig. 1, to bring the ears 27 out of alinement with the perforations in the knuckles 14, *b*, whereupon the pin 15 may be pushed out of its seat in said knuckle. As soon as the thill is freed from the pin 15, the knuckle *b* of the thill falls upon the supporting ledge 23, and is temporarily supported thereby, until the other thill has been disconnected from its coupling. Without this ledge the thill must either be supported by hand or by some improvised support, or it will sag down, thereby putting unnecessary strain upon the thills. The construction of thills is well known and requires no especial description, suffice it to say that they consist in general of two shafts that are connected near their points of support by a cross bar. The clip being formed of sheet metal and in one piece, provides a simple and cheap expedient for the purposes for which it is intended. The thill is free to swing in the knuckles 14 of the coupling, as no pressure is put upon it, which would be the case were a bolt and nut connection used to secure the two together. Furthermore it facilitates the attachment of the thill to the axle or its removal therefrom.

I claim as new and desire to secure by Letters Patent:

1. In a thill coupling, the combination of a thill yoke having suitable knuckles, a thill, a pin pivotally connecting the thill with the knuckles, a one piece spring clip comprising an upwardly arched portion, protecting ears extending laterally from said arched portion, arranged to hold the pin in place in the knuckles and thill and a ledge arranged below the knuckles and adapted to temporarily support the thill.

2. In a thill coupling, the combination of a thill yoke, having suitable knuckles, a thill, a pin pivotally connecting the thill with the knuckles, a spring clip made of a single piece of sheet metal and comprising a flat perforated portion arranged to be secured to the yoke, an arch portion extending over the yoke terminating in a horizontal portion, ears on said horizontal portion embracing the knuckles and a temporary thill supporting ledge upon the forward end of the flat perforated portion.

In witness whereof I have executed the above application this 2nd day of April 1907.

NELSON MARTIN BELL.

Witnesses:
HERMAN FELSENHED,
GEO. W. STEFFAN.